US008477332B2

(12) United States Patent
Shozaki et al.

(10) Patent No.: US 8,477,332 B2
(45) Date of Patent: Jul. 2, 2013

(54) SYSTEM AND METHOD FOR USER MANAGEMENT

(75) Inventors: Toshiya Shozaki, Osaka (JP); Kenichi Takahashi, Osaka (JP); Kaitaku Ozawa, Amagasaki (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1009 days.

(21) Appl. No.: 11/022,975

(22) Filed: Dec. 28, 2004

(65) Prior Publication Data

US 2006/0099947 A1 May 11, 2006

(30) Foreign Application Priority Data

Nov. 10, 2004 (JP) ................................ 2004-326051

(51) Int. Cl.
*G06F 3/12* (2006.01)
(52) U.S. Cl.
USPC ....................................................... 358/1.15
(58) Field of Classification Search
USPC ........................................................ 715/745
See application file for complete search history.

(56) References Cited

U.S. PATENT DOCUMENTS

| 6,310,692 | B1 * | 10/2001 | Fan et al. ..................... 358/1.14 |
| 6,515,757 | B1 | 2/2003 | Matsuo et al. |
| 6,745,334 | B1 | 6/2004 | Ikegami |
| 6,762,860 | B1 | 7/2004 | Watanabe et al. |
| 6,863,456 | B1 * | 3/2005 | Kato ............................. 400/76 |
| 6,985,244 | B1 * | 1/2006 | Bhogal et al. ................ 358/1.15 |
| 7,031,023 | B2 * | 4/2006 | Sasaki ............................ 358/1.9 |
| 7,372,589 | B2 * | 5/2008 | Ohara ........................... 358/1.15 |
| 2002/0089693 | A1 * | 7/2002 | Maruyama ................... 358/1.15 |
| 2003/0120736 | A1 * | 6/2003 | Eguchi ........................... 709/206 |
| 2004/0120747 | A1 * | 6/2004 | Okochi ........................... 400/76 |
| 2004/0141203 | A1 * | 7/2004 | Honma .......................... 358/1.15 |
| 2004/0190077 | A1 * | 9/2004 | Yamamoto et al. ........... 358/440 |
| 2005/0007618 | A1 * | 1/2005 | Thomason .................... 358/1.14 |
| 2006/0050291 | A1 * | 3/2006 | Morikawa et al. ............ 358/1.13 |
| 2008/0304092 | A1 * | 12/2008 | Ebuchi ........................... 358/1.13 |

FOREIGN PATENT DOCUMENTS

| JP | 11-73392 A | 3/1999 |
| JP | 2001-312474 A | 11/2001 |
| JP | 2001-344183 A | 12/2001 |
| JP | 2002-215344 A | 8/2002 |
| JP | 2002-245010 A | 8/2002 |
| JP | 2002-269094 A | 9/2002 |
| JP | 2003-051924 | 2/2003 |
| JP | 2003-167716 | 6/2003 |
| JP | 2003-271347 | 9/2003 |
| JP | 2004-015266 | 1/2004 |
| JP | 2004-90423 A | 3/2004 |

OTHER PUBLICATIONS

Helmig, Johannes, About User Management and Security in Windows XP, Apr. 21, 2002, pp. 1-12.*
Managing Disk Quotas on Windows 2000/XP, Dec. 19, 2002, pp. 1-5.*
Japanese Office Action dated Feb. 5, 2008, directed to counterpart JP Application No. 2004-326051 (7 pages).

* cited by examiner

*Primary Examiner* — Marivelisse Santiago Cordero
*Assistant Examiner* — Mesfin Getaneh
(74) *Attorney, Agent, or Firm* — Morrison & Foerster LLP (57) ABSTRACT

In user management for a device, when information on a user who wants to use a device is received, settings for the user to use the device based on the information are generated on the user. Then, the information on the user and the generated settings for the user are registered.

18 Claims, 6 Drawing Sheets

```
To:Suzuki@abc.co.jp
From:DeviceManager Bizhub350
Subject:NewEntry Complete!

[USER NAME]              [ICHIRO SUZUKI]
[USER ID]                [1234567]          [CHANGE]
[ABBREVIATED NO./NAME]   [No.1/Suzuki]      [CHANGE]
[GROUP ABBREVIATED NO./NAME] [No.1/Product Gr.] [CHANGE]
[BOX NO./NAME]           [No.1/Suzuki]      [CHANGE]
[BOX CAPACITY]           [100MB]            [CHANGE]
[BOX PASSWORD]           [9876543]          [CHANGE]
[FUNCTION RESTRICTION]   [Copy:OK/Scan:OK/  [CHANGE]
                          Print:OK/FAX:NG]
```

To:Suzuki@abc.co.jp
From:DeviceManager Bizhub350
Subject:NewEntry Complete!

| USER NAME | ICHIRO SUZUKI | |
| --- | --- | --- |
| USER ID | 1234567 | CHANGE |
| ABBREVIATED NO./NAME | No.1／Suzuki | CHANGE |
| GROUP ABBREVIATED NO./NAME | No.1／Product Gr. | CHANGE |
| BOX NO./NAME | No.1／Suzuki | CHANGE |
| BOX CAPACITY | 100MB | CHANGE |
| BOX PASSWORD | 9876543 | CHANGE |
| FUNCTION RESTRICTION | Copy:OK／Scan:OK／Print:OK／FAX:NG | CHANGE |

Fig.5

To:Suzuki@abc.co.jp
From:DeviceManager Bizhub350
Subject:NewEntry Complete!

YOU CAN APPLY FOR CHANGING FUNCTION RESTRICTION INFORMATION TO THE ADMINISTRATOR

| Copy | OK | NG |
| --- | --- | --- |
| Scan | OK | NG |
| Print | OK | NG |
| FAX | OK | NG |

APPLY

Fig.6

To:Suzuki@abc.co.jp
From:DeviceManager Bizhub350
Subject:NewEntry Complete!

YOU CAN CHANGE THE ABBREVIATED KEY NO. AND NAME.
PLEASE ENTER THEM.

ABBREVIATED KEY NO.

ABBREVIATED KEY NAME     CONFIRM

SYSTEM AND METHOD FOR USER MANAGEMENT

This application is based on application No. 2004-326051 filed in Japan, the contents of which are hereby incorporated by reference.

BACKGROUND OF THE INVENTION

1. Field of the Invention

The invention relates to user management for a device.

2. Description of the Background Art

It is known that any user, not a specified user, can receive services through a network from an image forming apparatus such as multi-functional peripheral (MFP) which incorporates a copy function, a print function, a facsimile function, a scan function and the like. For example, in a print network, client users can receive a print service by an MFP connected through the network.

In such a network, a person who accesses the network can easily view data stored therein, and the network is available even for a person who may change the data maliciously. For example, a document to be printed in the device may be peeped or falsified. Then, log-in management is adopted for security in which only previously registered users can use the network.

In some print networks, accounting is performed depending on, for example, an amount to be processed in the operation requested by a user. In this case, in order to limit the number of users and the capacity of work area, a user has to register before using the printer network, and a user ID and a password necessary to use the printer network are set in the registration.

Recently the functions provided in a multi-functional peripheral (MFP) are improved, and the user management is strengthened. For example, it is proposed that not only the management in the number of prints but also restriction of functions allowed to be used are registered for every user, and the users of the MFP is managed based on them (Japanese Patent laid open Publication No. 2003-167716, for example). As to the user management, it is known that an administrator or a user performs registration directly or through the network at their host computers. For example, in a system disclosed in Japanese Patent laid open Publication No. 2002-41435, the user registration is controlled in order to limit the number of users. In a print system disclosed in Japanese Patent laid open Publication No. 2003-271347, a printing is possible through the network. Here, a computer which requests a printing performs user registration to a printer with a Web browser. When the printer accepts the user registration, it issues a job ID, and a print operation is requested with the job ID. After the printing, the printer charges the computer for the printing.

In addition, automatic setting in a device is well known in the art. For example, in a facsimile machine disclosed in Japanese Patent laid open Publication No. 2003-51924, a telephone number of the destination is automatically registered from the telephone number stored in a transmission history or receipt history in memory dial function. In addition, in a facsimile machine disclosed in Japanese Patent laid open Publication No. 2004-15266, information on the destination is automatically registered in a one-touch dial, for example based on a transmission request signal received from an external terminal. Furthermore, in a system for inspecting a security hole disclosed in Japanese Patent laid open Publication No. 2002-32338, an ID is issued to be used when a user at a terminal as an object to be inspected logs sees the result of the inspection.

When the items to be set are limited to only a user ID, a password, an upper limit number of copies and information for limiting the use, it is not troublesome to set them for each user by an administrator. However, recently, as the functions of the MFP is improved, when a user is registered, it is needed to create many setting items such as a box function and its password, an abbreviated key for a registered user, and a group abbreviated key for a group (department) the registered user belongs to. The abbreviated key is an example of a so-called one-touch key to which destination information being registered, so that the destination can be set with one user's operation. When the user presses the abbreviated key displayed on the operation panel on transmission, the destination (an e-mail address or a facsimile number) can be set, and transmission thereto is started. Similarly, when a user presses the group abbreviated key on transmission, the destinations belonging to that group can be set, and transmission thereto is started. A box is a storage region created by partitioning a storage region in a recording medium such as a hard disk. A box name and a box password have to be registered for a user who wants to use a box, and its storage capacity has also to be set. In addition, in the MFP which can perform many functions, the administrator sets the restriction of the functions allowed for the user.

At present the administrator or a user registers the user, creates the abbreviated key, the group abbreviated key and the box for a user, and sets the function restriction information for the user individually. These settings are needed, for example, when the user changes its group but continues to use the MFP, besides when initial settings are registered by a user for the first time. At the time of these settings, for example, the administrator accesses the MFP in administrator mode and opens screens sequentially for address registration, group address registration, box setting and e-mail address registration. Here, it is necessary to refer to the group address and the box setting which have been already registered. Thus, a large amount of labor is needed in the settings, and a heavy burden is imposed on a person (the administrator in this case) who manually input those many settings items.

SUMMARY OF THE INVENTION

It is an object of the present invention to perform various kinds of settings in user registration in a system, without imposing a burden on a user.

In the user management for a device, when information on a user who wants to use a device is received, settings for the user to use the device are generated based on the information on the user. Then, the information on the user and the generated settings for the user are registered.

It is an advantage of the invention that the burden of an administrator on user management is decreased.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
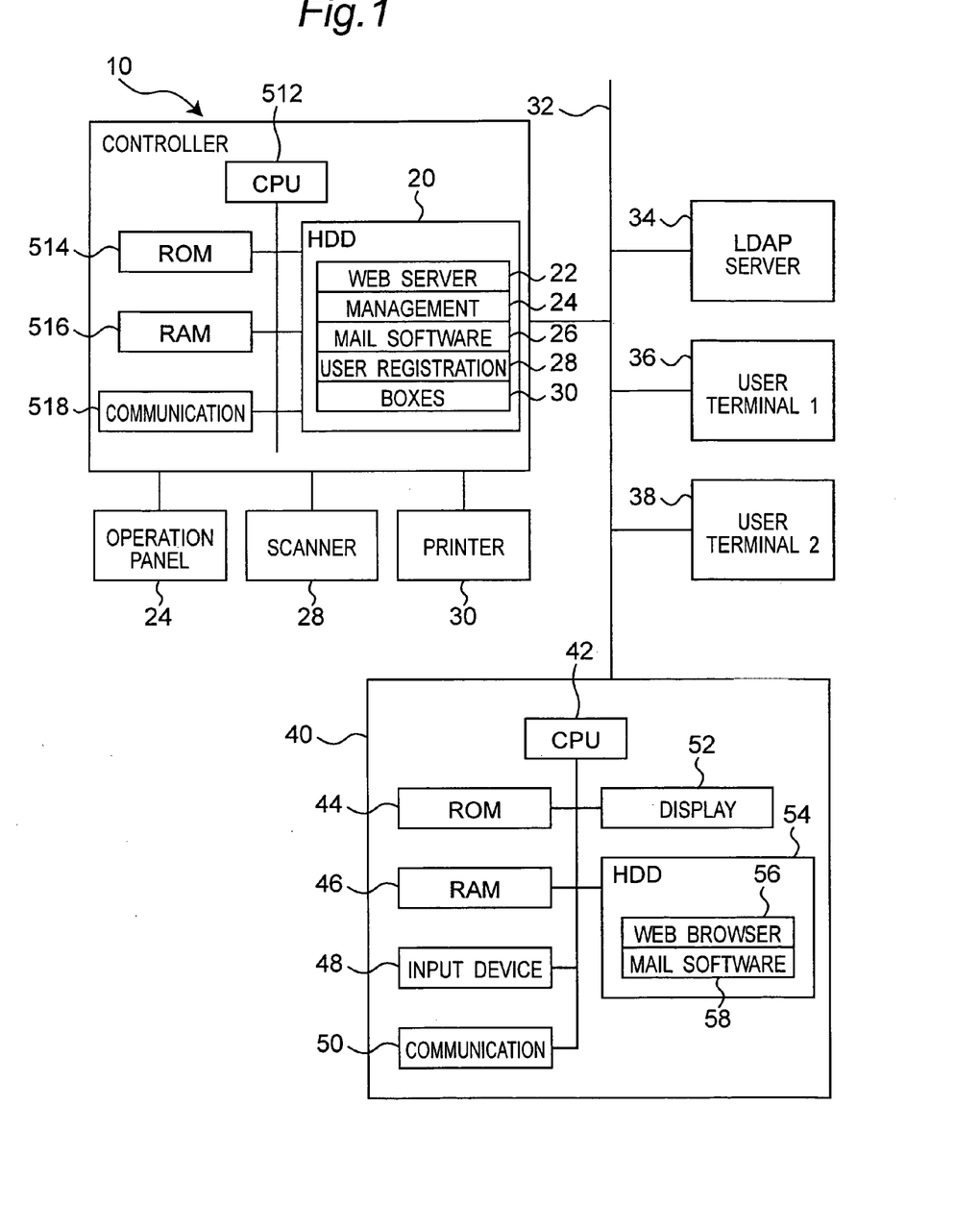
FIG. 1 is a diagram of a network system including user's terminals and an administrator's terminal.

Referring now to the drawings, wherein like reference characters designate like or corresponding parts throughout the several views, FIG. 1 shows a network system having a multi-functional peripheral (MFP) 10, which is a network device and has many functions to be operated as a printer, a copying machine, a scanner, a facsimile apparatus and the like. In the MFP 10, a control unit has an operation panel 26, a scanner 28 and a printer 30. In the control unit, a central processing unit (CPU) 12 which controls the entire MFP is connected to a read-only memory (ROM) 14 which stores programs, data and the like, a random access memory (RAM) 16 serving as a working area, a communication device 18 which communicates with the outside, and a hard disk drive 20 which is a high-capacity storage device. The hard disk drive 20 stores various programs and data and includes a Web server 22, a user management program 24, an electronic mail (e-mail) software 26, a user registration database 28, and boxes 30. A box is one of a plurality of partitioned storage regions in the hard disk, and it can be used as a storage region by a user registered thereto. Descriptions for the facsimile function and the like in the MFP 10 are omitted here. Various kinds of setting items to be described below are stored in the user registration database 28.

In this network system, the MFP 10 is connected to a lightweight dictionary access protocol (LDAP) server 34, user terminals 36 and an administrator's terminal 40 through a network 32 such as a local area network. An administrator of the MFP 10 manages the MFP 10 in the administrator's terminal 40. It is to be noted that the LDAP server 34 is an example of a server which registers destination address information in the network. The LDAP server 34 registers information such as personal names, group names, e-mail addresses, telephone numbers, facsimile numbers, company names and the like in a database therein. When a user inputs a search condition and accesses the LDAP server 34 to instruct to search data, the LDAP server 34 extracts an address from the database according to the search condition.

The administrator's terminal 40 is a computer having a conventional configuration. A central processing unit (CPU) 42 is connected to a read-only memory (ROM) 44 which stores programs, data and the like, a random access memory (RAM) 46 serving as a working area, an input device 48 such as a keyboard, a communication device 50 for communicating with the outside, a display device 52 and a hard disk drive 54 which is a high-capacity storage device. The hard disk drive 54 stores various kinds of programs and data such as a Web browser 56 and an e-mail software 58.

Next, registration of a user who wants to use the MFP 10 is explained. When a new user who is going to use the MFP 10 is registered, the administrator inputs user information in a web page of the user management program 24 which can be browsed through the Web browser 56, so that the MFP 10 automatically creates various settings required to use the service of the MFP and registers them, as will be explained below in detail. Thus, a burden of the administrator for the user registration can be reduced.

In addition, when the management program 24 completes the user registration, it informs both the user and the administrator of its contents by e-mails. Thus, the administrator can easily collect management data, while the user can easily get information to use the MFP 10.

When a user who has received the e-mail for the notification of the user registration wants to change the contents of the automatically created registration such as function restriction information or box capacity, he or she can describes a desired function or functions or a desired box capacity in the e-mail for notification shown in a screen of the display device by stating a change or changes in the screen and sends a return mail for the e-mail. Thus, the user can send a request for the change easily by the e-mail, without opening screens for changing the user registration and stating a request for the change in the screens.

The setting items are classified into two types: The setting items of one type need approval of the administrator, while those of the other do not need the approval of the administrator and can be changed by the relevant user. The MFP 10 classifies the items changed by the user into two types. Then, a request of setting change which needs the approval of the administrator is returned to the administrator, while a request of setting change which does not need the approval of the administrator is automatically accepted and registered when the request is returned to the MFP 10.

When the administrator approves the received e-mail on the setting change including items which needs the approval of the administrator, he or she transfers the e-mail to the MFP 10 to change and register the setting contents. Alternatively, the administrator can edit the registered contents by modifying them in the e-mail and by sending it as a return mail. The MFP 10 sends an e-mail of notification for the modified change to the user.

As mentioned above, the e-mail on the request for the setting change which does not need the approval of the administrator is sent directly to the MFP 10, and the changed contents are automatically registered. That is, when the sender of the e-mail for registration notification transmitted to the user is the MFP 10, the user can change the registered contents by sending a return mail for the e-mail without the approval of the administrator. When the contents of the user registration are changed, the MFP 10 automatically transmits an e-mail showing that the setting contents are changed to the administrator. A user list is attached to this e-mail.

Figure 2A:
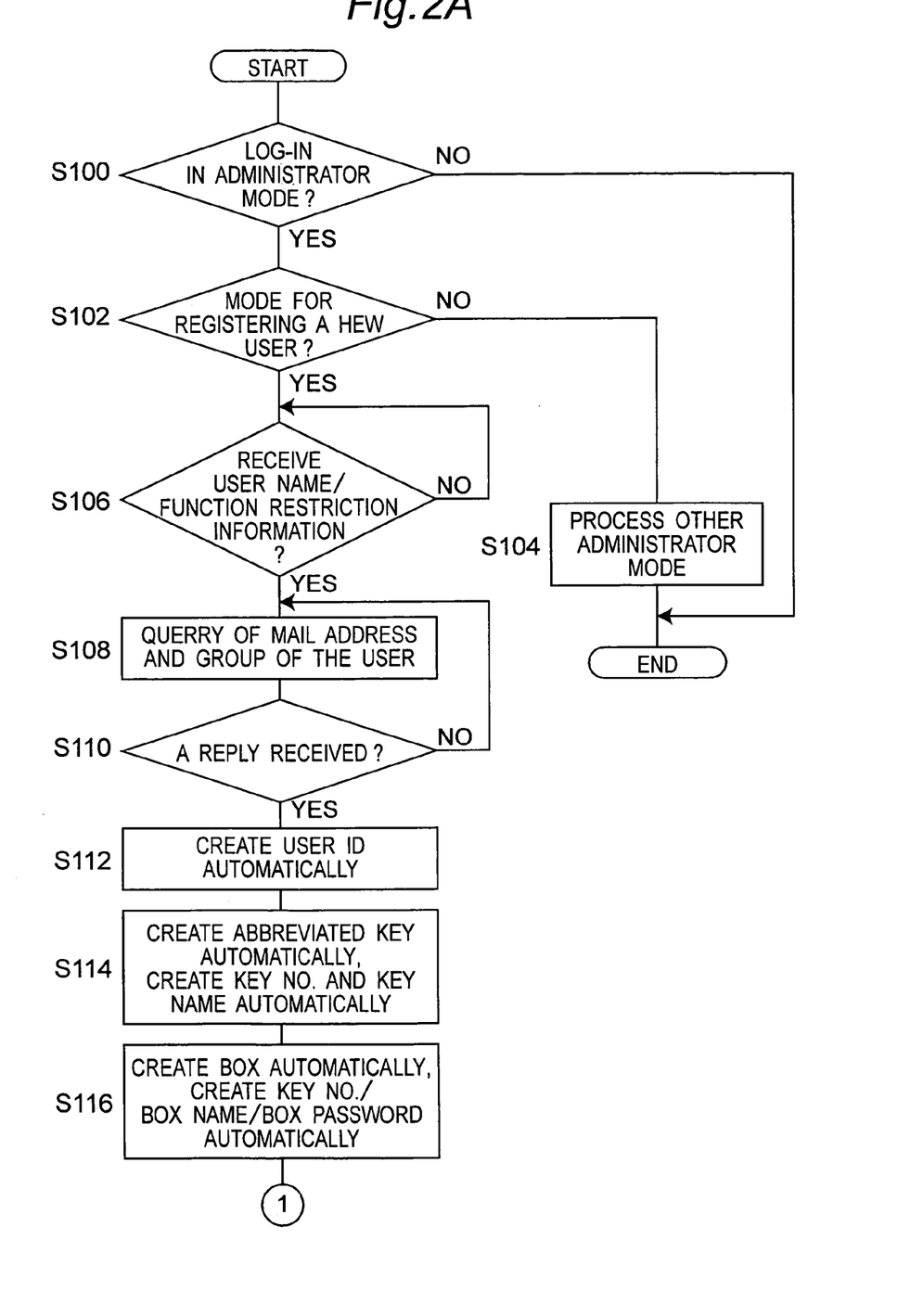
FIGS. 2A and 2B are a flowchart of a management program in a multi-functional peripheral.
Figure 2B:
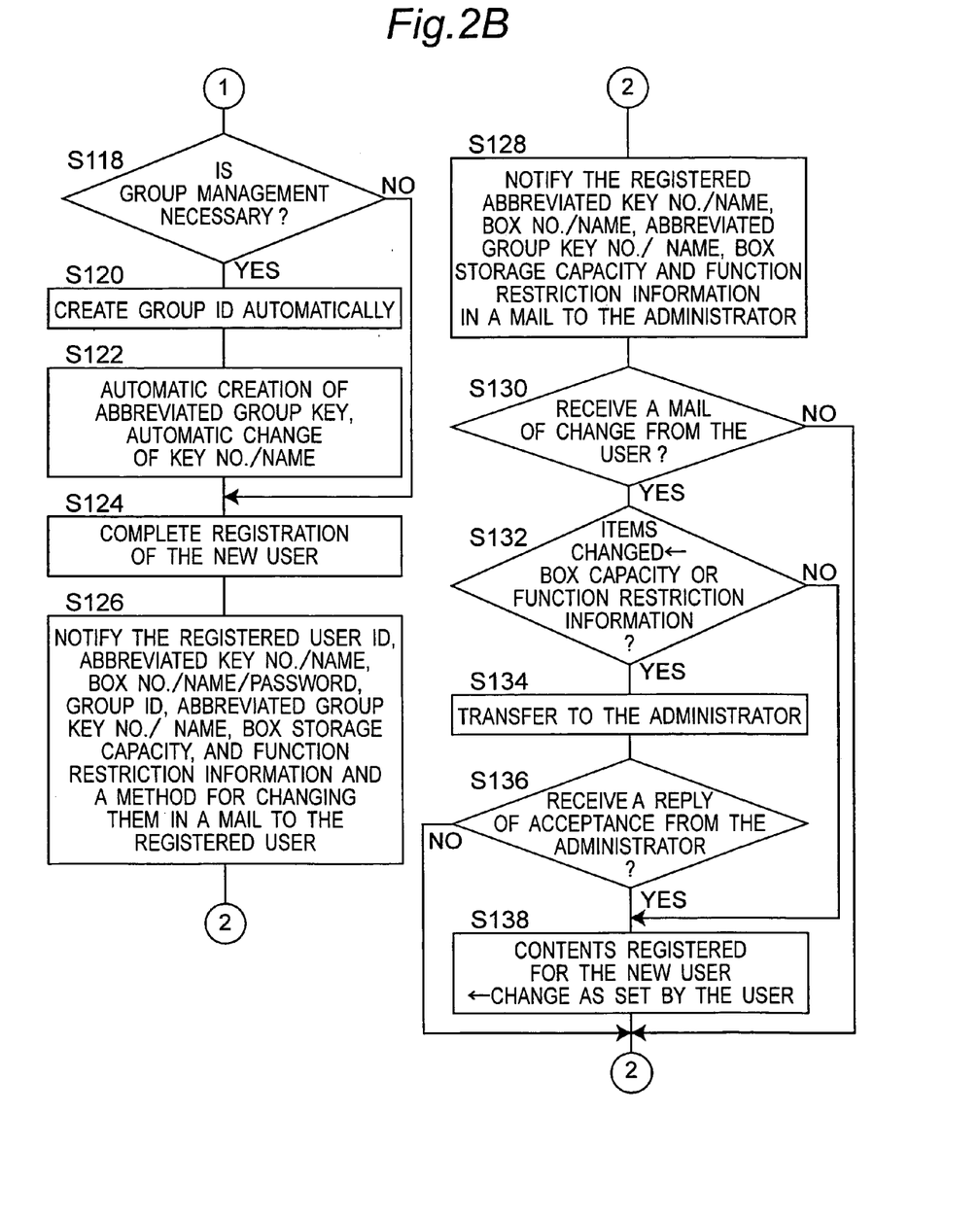

FIGS. 2A and 2B show the management program 24 in the MFP 10. When a system administrator wants to access the settings for system management of the MFP 10, he or she inputs a code number for log-in in an entry field in a screen for inputting a code number for the system administrator. When the log-in from the administrator is received in administrator mode (YES at S100), it is determined whether a mode set by the administrator is a new user registration mode or not (S102). When it is a mode other than the new user registration mode (NO at S102), the operation for the mode set by the administrator is performed (S104). When it is a new user registration mode (YES at S102), the following operations are performed. When a user name and function restriction information are received (YES at S106), an inquiry about an e-mail address and a group the user belongs to is sent to the LDAP server 34 (S108). When an answer is received from the LDAP server 34 (YES at S110), a user ID and an abbreviated key are automatically created (S112 and S114). Here, a key number and a key name are also created automatically. Then, a box is automatically created (S116). Here, a key number, a box name and a box password are automatically created. Then, it is determined whether the setting of group management is instructed or not (S118). When the group management is to be set, a group identification (ID) and a group abbreviated key are automatically created (S120 and S122).

Here, a key number and a key name are also created automatically. In addition, e-mail addresses set in the abbreviated key and the group abbreviated key are contained in the answer from the LDAP server 34. Then, the registration of the new user is completed with the automatically setting contents (S124). Thus, in the user registration, the abbreviated key, the group abbreviated key and the box (including the password) are automatically set, so that the burden of the administrator can be reduced.

Further, the registered contents are informed to the administrator and to the registered user by e-mails. That is, the registered user is informed by an e-mail of the registered contents including the user ID, the abbreviated key number/key name, the box number/name/password, the group ID, the group abbreviated key number/name, the box storage capacity, and the function restriction information, and a method for changing them (S126). On the other hand, the administrator is informed by an e-mail of the registered contents including the abbreviated key number/key name, the box number/name, the group abbreviated key number/name, the box storage capacity and the function restriction information (S128). The sender of the e-mails of registration notification transmits the e-mails with an address of the device (MFP) and/or the administrator. When the sender of the e-mail is the MFP 10, the registered contents can be changed without permission of the administrator as will be described below.

If the user who has been notified of the registered contents has an objection to the registered contents, he or she can change the registered contents by returning an e-mail after editing it. When the e-mail for the change is received from the user (S130), if the changed item is the box capacity or the function restriction information (YES at S132), that is, when the setting item needs the approval of the administrator, the e-mail is transferred to the administrator (S134). When the approval is received from the administrator by an e-mail (YES at S136), the registered contents are changed to the contents set by the user (S138). Then, the flow proceeds to step S128, in which the administrator is automatically notified that the setting contents are changed by an e-mail. The user list is attached to that e-mail. However, if the approval of the administrator is not received (NO at S136), the contents are not changed.

Figure 3:
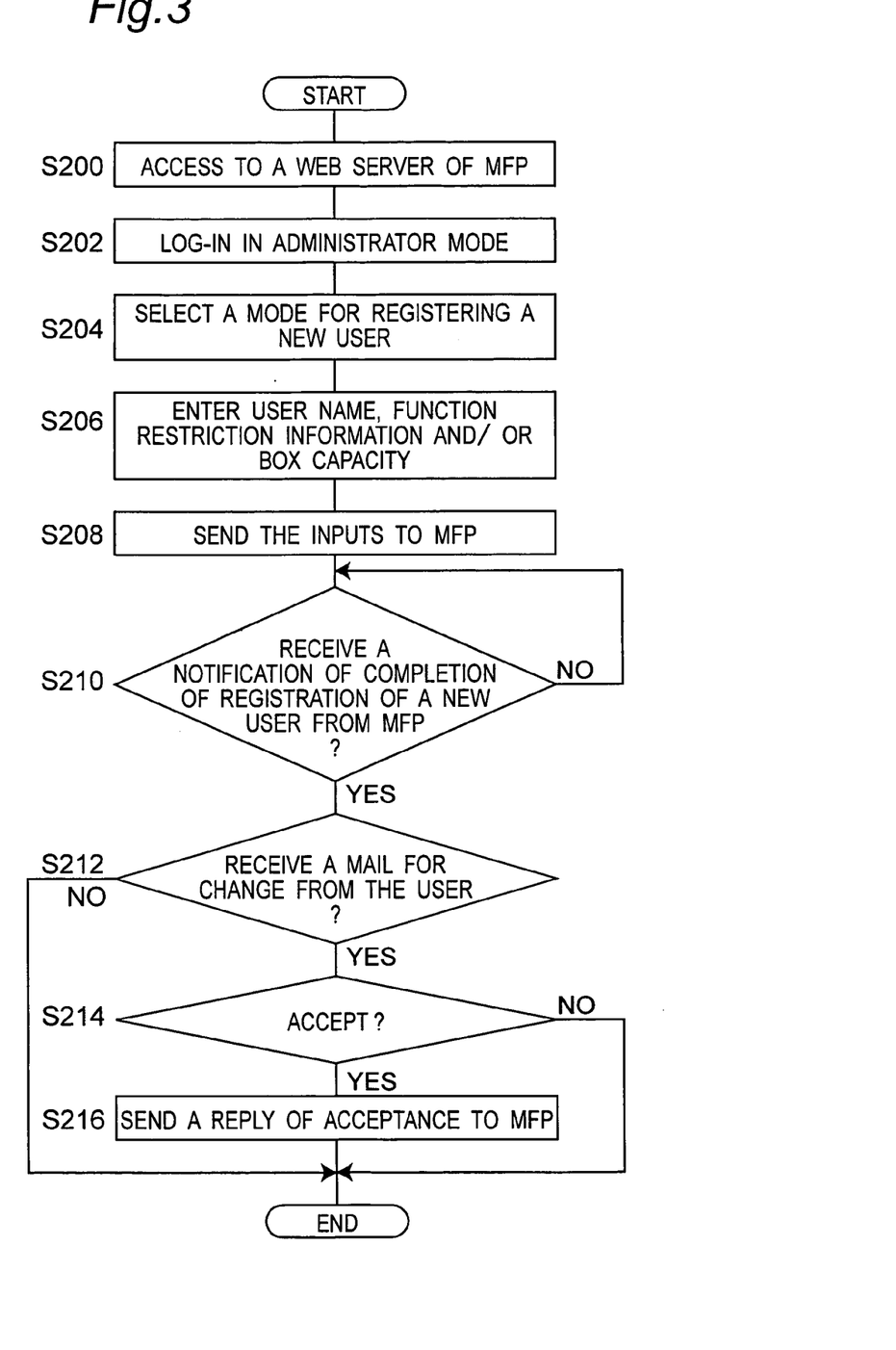
FIG. 3 is a flowchart of management by an administrator.

FIG. 3 is a flowchart of management in the administrator terminal 40. When the administrator registers a new user, the administrator accesses the Web server of the MFP (S200), and log-ins in the administrator mode (S202), and selects a new user registration mode (S204). A user name, function restriction information and box capacity are input in the new user registration mode (S206), and they are transmitted to the MFP 10 (S208). In the MFP 10, an abbreviated key, a group abbreviated key (in a case of group management) and a box (password is automatically allotted) are automatically and simultaneously created for the new user, and the new user is registered. Then, a notification that the new user registration has been completed is automatically sent from the MFP by an e-mail (S210). The e-mail includes the created detailed contents of the functions.

Further, when the e-mail is sent from the registered user (S212), if it includes a request for changing the registered contents from the user, its contents are displayed on a screen showing the request. The administrator views the screen and determines whether to approve the change or not (S214). Alternatively, the change request e-mail from the user may be sent to the MFP 10, and the administrator may open the screen showing the request of the change of the registered contents when he or she accesses the setting for the system management of the MFP 10. The screen shows the setting items and the contents the user wants to change as well as a message such as "the change was requested, and press OK button in case of YES or press NG button in case of NO". The administrator checks the requested change of contents, and when they are appropriate, presses OK button. Thus, the change is approved, and the result is sent to the MFP 10 in a return e-mail (S216). Thus, the MFP changes the registration actually. If the contents of the requested change are not appropriate, the administrator presses NG button so that the request for changing the registered contents from the user is not approved and the registered contents are not changed.

Figure 4:
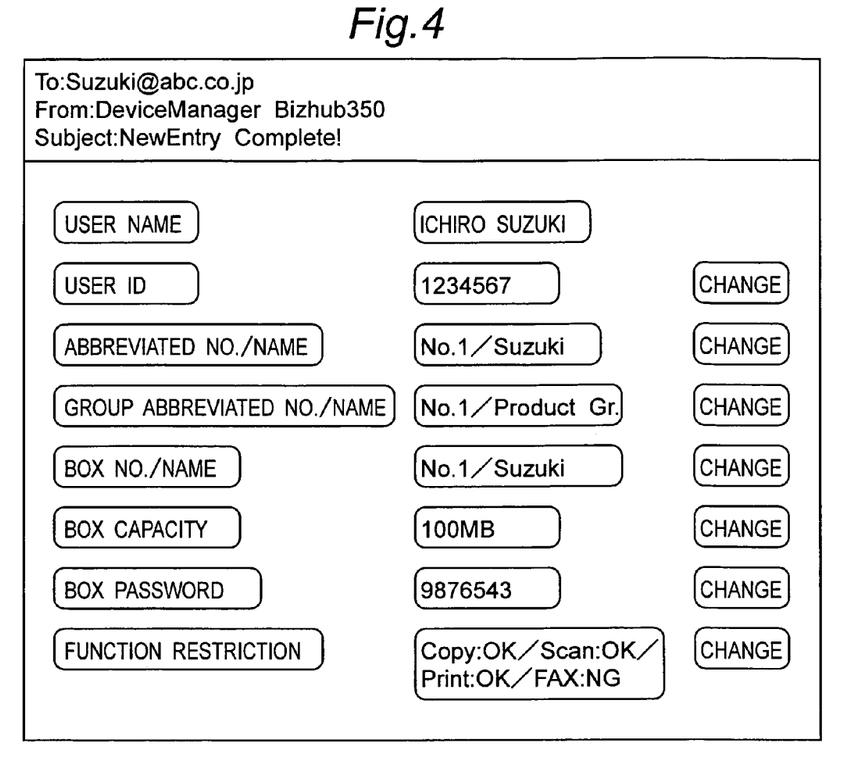
FIG. 4 is a diagram of an e-mail to be sent to a registered user from the multi-functional peripheral.

FIG. 4 shows the contents of an e-mail for notification sent from the MFP to the registered user at step S126 in FIG. 2A. Here, the user name, the box capacity and the function restriction information have been set by the administrator. Other items are automatically created by the management program 24 in the MFP. For example, the user ID for certificating the user is automatically created. The name of the abbreviated key is automatically created from the input user name, the name of the group abbreviated key is created based on the group name the user belongs to, the group name being obtained from the LDAP server 34, and the name of the box is automatically created from the input user name. The box password is also automatically set in a predetermined way. In addition, the numbers of the abbreviated key, the group abbreviated key and the box are created by using numerals such as "No. 1", and they are automatically created next to the number which has already been registered. This example shows that the abbreviated key number, the group abbreviated key number and the box number are all registered first. The items with "CHANGE" buttons at the right side thereof can be changed by the user. The same e-mail is also sent to the administrator.

An e-mail for notification is prepared in such a way that when the registered user wants to change the contents set automatically, he or she can input the change in the e-mail for notification to return the e-mail. Then, the user who receives the notification e-mail inputs setting contents to be changed, if any, in the notification e-mail and sends a return e-mail for requesting the change of the settings. In this way, when the user wants to change the setting contents, it is only necessary to input the change in the screen in which the notification e-mail is shown and to send it back to request the change. Therefore, the user can easily change the settings without a log in to open screens for requesting the change.

There are two types in the setting items. One type thereof needs approval of the administrator and the other type can be changed by the user. Thus, an e-mail for the notification containing the settings which need the approval of the administrator is sent back to the administrator, while another e-mail for the notification containing the settings which do not need the approval of the administrator is directly sent to the MFP.

Figure 5:
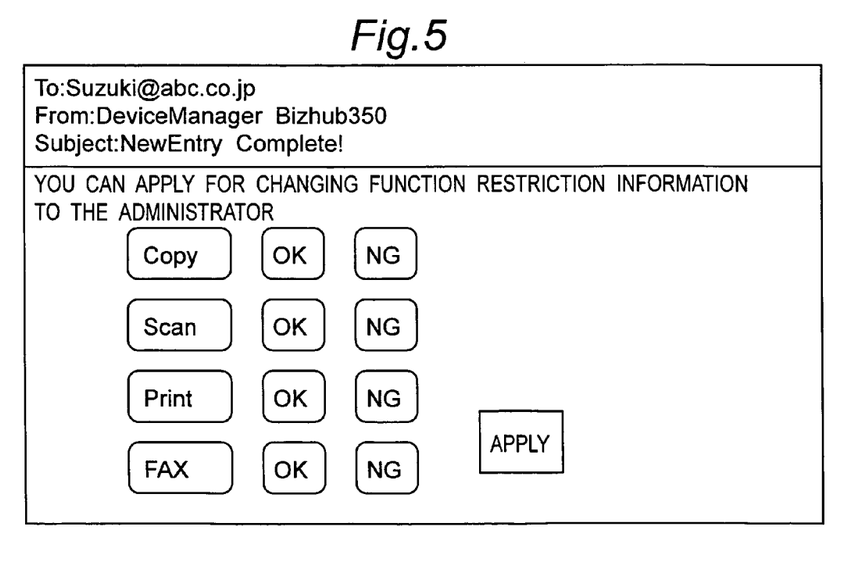
FIG. 5 is a diagram of an e-mail for requesting a change in function restriction information.

FIG. 5 shows a return e-mail on the function restriction information. The change in the function restriction information needs the approval of the administrator. The MFP 10 has four functions of copy, scan, print and fax. In this example, the scan function includes management of the boxes. When a user wants to change the function restriction set by the administrator, he or she describes the desired function or functions and returns the e-mail to the administrator's terminal 40 to request the change of the function restriction information.

Figure 6:
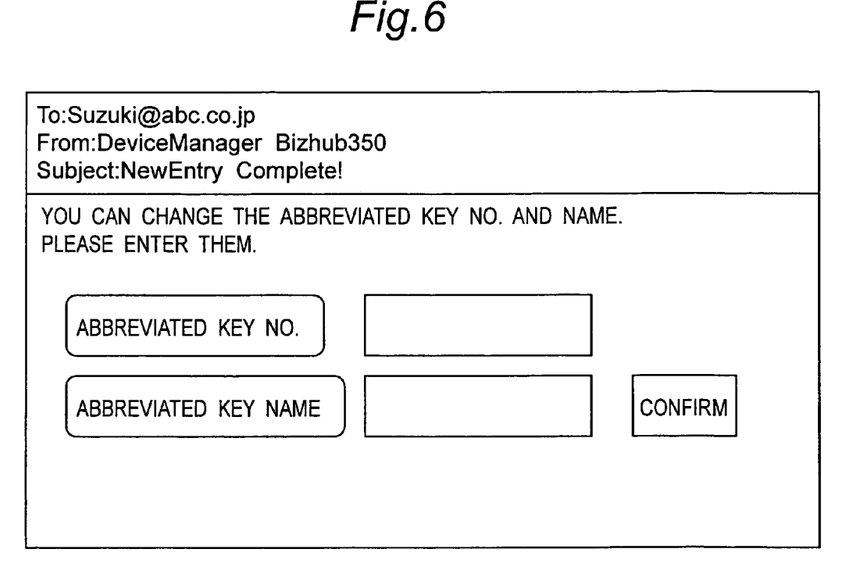
FIG. 6 is a diagram of an e-mail for requesting a change in abbreviated key number/name.

On the other hand, FIG. 6 shows a return e-mail on the abbreviated key number/name. When the user wants to change the abbreviated key number or the abbreviated key name, a desired number or name is entered in the return e-mail. Then, the mail is returned to the MFP 10. Thus, the change in the setting contents is automatically registered at the MFP 10.

As explained above, according to the above-mentioned embodiments of the present invention, since the various kinds of settings needed for receiving services of a device such as a multi-functional peripheral is automatically created and registered based on the input data of the user information, the burden on a person (administrator) in charge of the user registration can be reduced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A management apparatus for managing users who use a device, comprising:
    an input device configured to receive information on a user who wants to use the device;
    a creator device configured to automatically create various settings for the user to use the device, based on the received information;
    a register device configured to register, in association with the user, the received information on the user and the created settings; and
    a notifying device configured to send a notification of the registered settings to both the user and an administrator through a network, the registered settings associated with the notification comprising a first type of setting that does not require permission of the administrator of the device to be changed and a second type of setting that requires permission of the administrator of the device to be changed,
    wherein in the notification, buttons for receiving a request for change of the registered settings from the user are provided so as to correspond to the registered settings, respectively,
    wherein the user can input a content for change of each of the registered settings by depressing each of the buttons, and addresses of the request for change of the registered settings are allotted to the settings, respectively,
    wherein when the registered setting, the request for change of which has been received from the user, is the first type of setting, the address of the request for change of the registered setting is an address of a corresponding device, and
    wherein when the registered setting, the request for change of which has been received from the user, is the second type of setting, the address of the request for change of the registered setting is the address of the administrator of the device.

2. The management apparatus according to claim 1, wherein the first type of the registered settings includes user identification.

3. The management apparatus according to claim 1, wherein the second type of the registered settings include a storage capacity of a box to be assigned to the user.

4. The management apparatus according to claim 1, wherein the second type of the registered settings include information for restricting functions of the device to be used by the user.

5. The management apparatus according to claim 1, wherein said creator device is configured to acquire information on the user from an external server based on the received user information and to automatically create the settings based on the acquired information.

6. The management apparatus according to claim 5, wherein the acquired information comprises at least one of a name, a group name and a mail address on the user, retrieved according to the user information stored in the external server.

7. The management apparatus according to claim 1, wherein the settings on a box include a box name and a box number of the box to be assigned to the user.

8. The management apparatus according to claim 1, wherein the settings comprise at least one of an abbreviated key for setting an address with user's one-touch operation, a group abbreviated key for setting a group of addresses with user's one-touch operation, and a box as a storage region assigned in a storage device in the device.

9. A management method for managing users who use a device, comprising:
    receiving information on a user who wants to use the device;
    automatically creating, based on the received information, various settings for the user to use the device;
    registering, in association with the user, the received information on the user and the created settings;
    sending a notification of the registered settings to both the user and an administrator through a network, the registered settings associated with the notification comprising a first type of setting that does not require permission of the administrator of the device to be changed and a second type of setting that requires permission of the administrator of the device to be changed, in the notification, buttons for receiving a request for change of the registered settings from the user being provided so as to correspond to the registered settings, respectively,
    allowing the user to input a content for change of each of the registered settings by depressing each of the buttons, addresses of the request for change of the registered settings being allotted to the settings, respectively,
    when the registered setting, the request for change of which has been received from the user, is the first type of setting, setting the address of the request for change of the registered setting to an address of a corresponding device, and
    when the registered setting, the request for change of which has been received from the user, is the second type of setting, setting the address of the request for change of the registered setting to the address of the administrator of the device.

10. The management method according to claim 9, further comprising acquiring information on the user from an external server based on the received user information and automatically creating the settings based on the acquired information.

11. The management method according to claim 10, wherein the acquired information comprises at least one of a name, a group name and a mail address on the user, retrieved according to the user information stored in the external server.

12. The management method according to claim 9, wherein the first type of the registered settings include user identification.

13. The management method according to claim 9, wherein the settings on a box include a box name and a box number of the box to be assigned to the user.

14. The management method according to claim 9, wherein the second type of the registered settings include a storage capacity of the box to be assigned to the user.

15. The management method according to claim 9, wherein the second type of the registered settings include information for restricting functions of the device to be used by the user.

16. A non-transitory computer-readable medium embodying a computer-executable program which, when executed by a processor, causes the processes to execute a method for managing users who use a device comprising the steps of:
- receiving information on a user who wants to use the device;
- automatically creating, based on the received information, various settings for the user to use the device;
- registering, in association with the user, the received information on the user and the created settings;
- sending a notification of the registered settings to both the user and an administrator through a network, the registered settings associated with the notification comprising a first type of setting that does not require permission of the administrator of the device to be changed and a second type of setting that requires permission of the administrator of the device to be changed, in the notification, buttons for receiving a request for change of the registered settings from the user being provided so as to correspond to the registered settings, respectively,
- allowing the user to input a content for change of each of the registered settings by depressing each of the buttons, addresses of the request for change of the registered settings being allotted to the settings, respectively,
- when the registered setting, the request for change of which has been received from the user, is the first type of setting, setting the address of the request for change of the registered setting to an address of a corresponding device, and
- when the registered setting, the request for change of which has been received from the user, is the second type of setting, setting the address of the request for change of the registered setting to the address of the administrator of the device.

17. The computer-readable medium of claim 16, wherein the method further comprises acquiring information on the user from an external server based on the received user information and automatically creating the settings based on the acquired information.

18. The computer-readable medium of claim 17, wherein the acquired information comprise at least one of a name, a group name and a mail address on the user, retrieved according to the user information stored in the external server.

* * * * *